United States Patent [19]
Calvert

[11] Patent Number: 5,425,181
[45] Date of Patent: Jun. 20, 1995

[54] TAPE MEASURE DEPLOYMENT AID

[76] Inventor: Kenneth E. Calvert, Rte. 6 Box 721, Alvin, Tex. 77511

[21] Appl. No.: 117,865

[22] Filed: Sep. 7, 1993

[51] Int. Cl.[6] ............................................. G01B 3/10
[52] U.S. Cl. ......................................... 33/770; 33/759
[58] Field of Search ................. 33/755, 756, 757, 758, 33/759, 760, 770, 27.03

[56] References Cited

U.S. PATENT DOCUMENTS

| | | | |
|---|---|---|---|
| 475,470 | 5/1892 | Roe | 242/84.8 |
| 3,204,339 | 9/1965 | Jorde | 33/770 |
| 3,276,490 | 10/1966 | Johansson | 33/755 X |
| 3,824,695 | 7/1974 | McClay, Jr. | 33/759 |
| 4,970,802 | 11/1990 | Nosek . | |
| 5,038,493 | 8/1991 | Stabs . | |
| 5,056,234 | 10/1991 | Han . | |
| 5,167,165 | 12/1992 | Brucher et al. . | |
| 5,231,769 | 8/1993 | Mahan | 33/770 |

FOREIGN PATENT DOCUMENTS 11333 of 1912 United Kingdom ................. 33/758

OTHER PUBLICATIONS

Lietz Catalog 109, 1993 pp. 119, 123.

Primary Examiner—Alvin Wirthlin

[57] ABSTRACT

This invention pertains to a tape measure deployment aid for measuring roof surfaces. The deployment device described by this invention consists of a roller that rotates freely on an axle which is connected to a yoke and then attached with linkage fasteners to a tape measure. This invention also includes two methods of using the tape measure deployment aid.

18 Claims, 3 Drawing Sheets

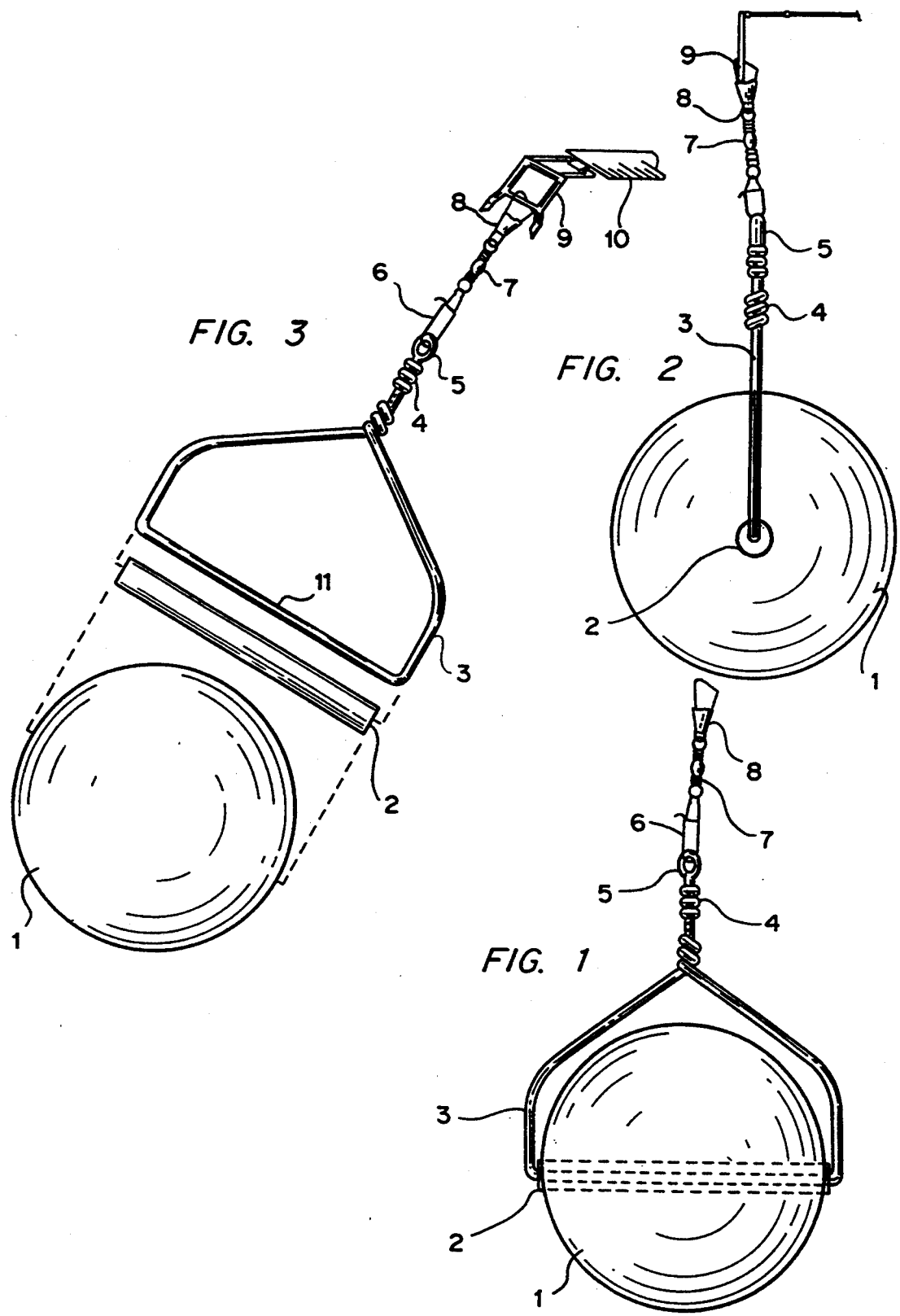

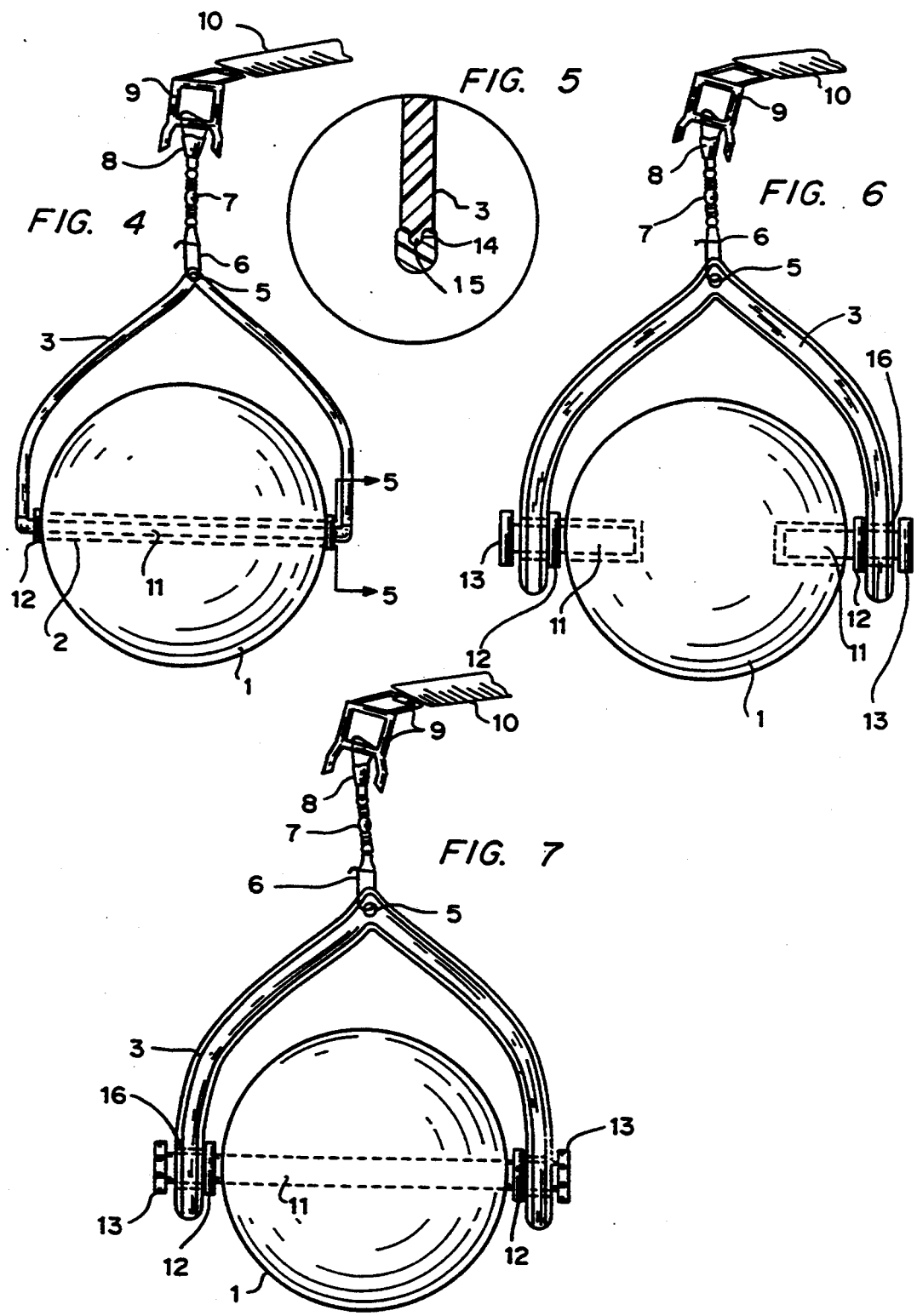

TAPE MEASURE DEPLOYMENT AID

BACKGROUND OF THE INVENTION

FIELD OF THE INVENTION AND DESCRIPTION OF THE BACKGROUND ART

This invention relates to a measuring device accessory which can be attached to standard measuring tapes, permitting gravity assisted deployment of the measuring tape.

In the field of building and the field of assessment of structural damage to buildings, it is often necessary to have accurate measurements or surveys of roof dimensions. Likewise it is often difficult and dangerous work to acquire these measurements. There are two well known techniques, one makes use of a wheeled measuring device with a stick handle and a counter such as a Rolatape TM or a Redi-measure TM, the other method makes use of an ordinary measuring tape or surveying chain. Both methods require the surveyor to walk to the boundaries of the roofs. It is general knowledge for those who work in the field that a weight of some sort can be attached to a tape measure and thrown or jiggled to help get the tape measure towards the roof edge. The inventor of this measuring device, having heard of round weights fixed to a tape end, fabricated a tape deployment aid which consisted of a rubber ball fixed by a swivel attachment to a tape measure, and experimented with the device for several years. In use this first device was gently teased or jiggled down the roof surfaces and required quite a lot of careful sideways motions to get the tape measure to the edge of the roof. The present invention relates to a new and improved deployment device which is easily attached to a standard tape measure and which greatly simplifies the task of acquiring roof measurements safely, rapidly and accurately without causing the tape to twist or slant. The present invention also relates to methods for using this measuring device.

The prior art comprises U.S. Pat. Nos. by Nosek 4,970,802, Stabs 5,038493 and Han 5,056,234, and Brucher et al. 5,167,165, each of which is hereby specifically incorporated by reference for all disclosed therein.

In the prior art there are numerous wheeled measuring devices such as seen in Nosek U.S. Pat. No. 4,970,802. These wheeled devices have been used by surveyors and others for many years. The measurements attained by these devices, when used to measure roof dimensions, are not as accurate as those attained by using steel tape measurements, and using wheeled devices on roofs is inherently unsafe, requiring the surveyor to traverse the entire roof and travel all the way to the edge of the roof.

Also in the prior art are numerous attachments to levels and tape measures which are job specific, like that shown by Stabs U.S. Pat. No. 5,038,493 which has a "sensing head pivotally secured to one end of an elongate measuring rod". Additionally, there are numerous patents for tape measures with magnets, hooks, corner braces allowing for one person to take measurements alone, or to take measurements from corners.

U.S. Pat. No. 5,056,234 by Han is a roofing tile course marking device. This patent also makes use of a steel tape measure with a "gripping means" that is attached manually to the end of the roof.

U.S. Pat. No. 5,167,165 by Brucher et al. is a device for positioning a measuring element that is motor driven and that "moves in planar and circular movements in addition to the commonly performed pivoting movements."

The above references are all for measuring devices of various types, some of which can be used for measuring roof dimensions. The present rolling and swiveling deployment aid for attachment to a tape measure or surveying chain differs from the prior art by allowing for measurements to be attained by a single individual, with speed and accuracy, and without having to walk down the sloping sides of a roof or lean over the edge of a roof.

SUMMARY OF THE INVENTION

The object of the present invention is to provide for a device that allows for accurate and rapid measurements of roofs and similar structures to be attained without the user having to take life threatening measures to get these figures. A further object of this invention is for the device to be economical to produce, simple to use, and to be lightweight and compact enough to carry easily in one's pocket or on a belt.

The measuring device of the present invention includes a rolling element which consists of a ball with a bored central opening that can be lined with a sleeve made out of a smooth slick and rigid or semi-rigid material like plastic, nylon, metal or wood that minimizes friction and allows for unhindered rotation when operating on an axle. The rolling element or ball is of a selected weight so that it is not blown by the wind and is heavy enough to carry the tape measure down the full extent of the roof. The chosen weight of the ball also being substantial enough to throw the device from a ladder, if necessary. Additionally, the ball is not so heavy that it is a burden to carry on one's person.

The yoke and axle elements of the present invention can be continuous with each other and can be fabricated from heavy gauge wire. The wire can be bent into a yoke with a stirrup shaped configuration; the horizontal portion of the wire acting as an axle element for containing the rolling element in a manner that allows the rolling element to move with unhindered rotation. The stirrup shaped yoke can have a symmetrical form with arched or triangular legs continuous with the axle element. Furthermore, when joining together the ends of wire that form the axle and yoke elements, by twisting the wire strands together, an opening is incorporated in the twisted ends for connecting to a series of linkage fasteners with a swivel connection.

Another version of the yoke design may comprise a removable axle pin that fastens onto a two sided arch shaped yoke, both being made from smooth durable materials like nylon or plastic. The two connecting points of the axle pin to the yoke assembly being rounded and smooth so that the device will not catch on roof shingles and the like. A further version of the yoke design may comprise dual axle pins contiguous with the yoke element although non contiguous one to the other.

The connecting element comprises a swivel fastener sandwiched between two linkage fasteners which are small locking hooks that allows for the yoke and ball assembly to be securely connected to a standard tape measure.

To operate, the present invention is allowed to roll as gravity acts upon the ball or wheel, carrying a free length of measuring tape, from the peak of a roof to just beyond the roof's edge where the small metal tab found on the end of most standard tape measures, will catch the roof's edge. This allows for accurate measurements of the roof without the operator having to walk the perimeter of the roof. The device rapidly travels a straight path down the roof so the tape measure follows behind without twisting or deviating from the same straight path.

An alternate method of operation of the present invention involves an operator throwing the device with a free length of measuring tape, from a ladder propped to the side of a building so that the device causes the tab on the end of the measuring tape to catch on the ridge of the roof and the measurement to be read at the roof's edge. This method being desirable or even necessary with very steep gabled roofs.

BRIEF DESCRIPTION OF THE DRAWINGS

FIG. 1 shows an embodiment of the invention from the front view.

FIG. 2 shows an embodiment of the invention from the side view.

FIG. 3 is an exploded view of an embodiment of the invention depicted in FIG. 1 and FIG. 2.

FIG. 4 is another embodiment of the invention shown from the front view.

FIG. 5 is a detailed view of a portion of the embodiment of the invention depicted in FIG. 4.

FIG. 6 is a front view of another embodiment of the invention.

FIG. 7 is a front view of another embodiment of the invention.

DETAILED DESCRIPTION OF THE INVENTION

Figure 8:
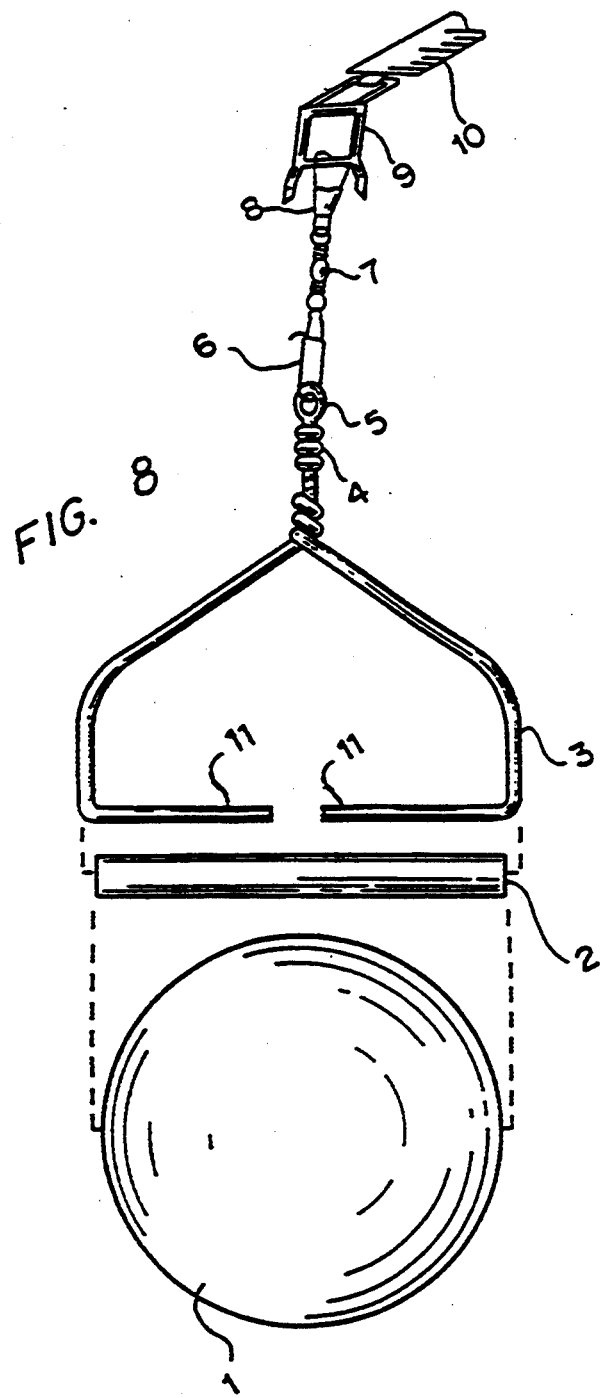
FIG. 8 is an exploded view of another embodiment of the invention.

Referring to FIG. 1, FIG. 2 and FIG. 3, an embodiment of a tape measure deployment aid described by this invention is shown. FIG. 1 showing a frontal view depicts rolling element 1 which in this case is a ball that is small in diameter and light weight, so that it is very portable and also heavy enough to deploy the tape measure down the roof slope, and can prevent the wind from blowing it when in use. The rolling element can be a ball that is elastomeric, rubber or made of some alternative material that has a rounded circular or cylindrical shape. These materials and shapes will allow for smooth rotation and adaptability to various roof surfaces so that the device will roll unhindered and without catching on shingles and other surface protrusions found on roof surfaces. Additionally the elastomeric and rubber materials are lightweight yet heavy enough to counteract weather elements like wind gusts or debris like rocks, sticks found on roof surfaces and heavy enough to carry the tape or chain all the way down the roof. Also when using the throwing method where the device is thrown from a ladder to the ridge of a roof, the ball must be heavy enough to throw accurately and as far as necessary. In this embodiment the ball is 2.3125" in diameter. Likewise the elastomeric and rubber rolling element is lightweight and portable; it can easily be attached to a belt or carried in a pocket.

Many styles and types and sizes of tapes are found in the market. All are considered to be within the scope of the present invention.

It is anticipated that the rolling element will be sized and otherwise integrated with the other components of the actuating device of the present invention to perform with a specific type or at least a specific class or range of tapes. The below described specifics are for an illustrative embodiment that complements a Lufkin 100, 100 foot tape measure.

Referring to FIG. 1, FIG. 2, and FIG. 3, rolling element 1 is shown to be centrally pierced it's entire length by a ¼" opening. Sleeve 2 is fitted snugly into the opening of rolling element 1 and extends slightly from both sides of rolling element 1. Sleeve 2 can be fabricated from metal, plastic, nylon, wood or other like material. Sleeve 2 is 2.5" in length. Yoke 3 in this embodiment is fashioned from a single piece of heavy gauge wire in this embodiment 10 gauge, to form a symmetrical arch containing a continuous straight portion of wire which functions as an axle pin 11 when rolling element 1 and sleeve 2 assembly are positioned on axle pin 11 which is 2.75" in length. The wire ends of yoke 3 are twisted to form neck 4 and finish with eyelet 5 which allows for the rolling element 1 to be attached to linkage fastener 6. Yoke 3 has a comparable length to rolling element 1 from the top of eyelet 5 to the axle pin 11. Linkage fastener 6 is a simple wire loop and wire hook end which is ⅝" in length. Linkage fastener 6 attaches to swivel connector 7 which is a small ball swivel with metal loops on both sides of the ball swivel and with a total length of ⅝". A swivel connector allows for improved mobility of the tape measure deployment aid and helps the device to travel in a straight downward path without being diverted by protrusions found on the various roof surfaces. Also by providing a swivel element, the trailing tape or surveying chain will not get twisted and a true measurement will be attained. Swivel connector 7 attaches at it's other end to fastener 8 which is also ⅝" in length. Fastener 8 is joined onto a metal end tab 9 which is a common fixed element on tape measures or linked onto an end portion of a surveying chain. A tape measure 10 is also depicted to show entire assembly of one embodiment of a tape measure deployment aid and how it attaches to a standard tape measure.

FIG. 2 shows a side view of the embodiment portrayed in FIG. 1. This figure shows the central hole in rolling element 1 to allow for even rolling of the rolling element. In FIG. 2, sleeve 2 is fitted snugly into rolling element 1 and then positioned on axle pin 11 which is continuous with yoke 3. The purpose of sleeve 2 which is fashioned out of a smooth material like nylon, plastic, metal or wood is to further provide for smooth rotation by limiting surface irregularities within the bored channel of rolling element 1 and therefore decreasing the amount of friction created when the device is in use so the device will roll unhindered and be driven by gravity in a straight downward path so the trailing tape or chain will follow smoothly and straight ward and the measurement taken will be accurate.

FIG. 3 is an exploded view of the embodiment depicted in FIG. 1 and FIG. 2. Sleeve 2 fits snugly inside rolling element 1 and extends slightly from either side of rolling element 1 so the combined rolling element 1 with sleeve 2 will turn smoothly and with less friction, without rolling element 1 rubbing against the arms of yoke 3 and diverting the straight downward path of least resistance of the tape measure deployment aid. FIG. 3 depicts the shape of the yoke 3 with continuous axle pin 11 and with twisted neck 4 and eyelet 5 portions. Yoke 3 depicted in FIG. 3 is smooth, strong and of a heavy gauge wire which is 10 gauge in this embodiment, so that it will not distort under normal use when measuring roofs and when being carried by workers to and from various locations, and so it will allow for the rolling element 1 with sleeve 2 to roll on axle pin 11 with out binding on any portion of yoke 3 or catching on roof surface protrusions. In this embodiment because yoke 3 is made of 10 gauge wire, it is easy to assemble rolling element 1 and sleeve 2 on yoke 3. Also by having axle pin 11 being an integral continuous portion of yoke 3, the joining of axle pin 11 is smooth and strong. When this embodiment is in use, the axle pin 11 can not detach without the wire breaking which is very unlikely under normal circumstances. Eyelet 5 is similarly smooth and round so it is easily attached to linkage fastener 6 and the ensuing attachment allows for unhindered movement of the device when acted upon by gravity. The linkage chain consisting of linkage fastener 6, swivel connector 7 and linkage fastener 8 serve to join up the rolling portion of the invention with the tape measure or surveying chain in a way that further assures freedom of unrestricted movement of the deployment aid by incorporating a swivel linkage in the linkage chain so that the device will roll straight downward and not in an inaccurate sideways manner. The linkage chain is furthermore an optimal length of approximately 2" so it will not get tangled on any surface protrusions on roof structures. Also and most importantly, if the linkage chain is much longer, the device will hit roof gutters and the tape end tab 9 will not attach to the roof edge properly so the measurement acquired will not be accurate.

The embodiment described by FIG. 1, FIG. 2 and FIG. 3, specifies the best known mode of the present invention. It is the embodiment that has been made and tested successfully by the inventor using a rubber ball as a rolling element, a heavy piece of wire as a yoke and axle element and a swivel fastener with some linkage fasteners as connection means.

FIG. 4, FIG. 6, FIG. 7, and FIG. 8 describe potential alternate embodiments, that may have the anticipated advantages of being easier to manufacture on a large scale, less expensive and time consuming to assemble, be more durable, and operate more smoothly. For example, the use of nylon to make yoke and axle means would make a device that would be difficult to bend out of the desired shape or break unless exposed to extreme temperatures. It also possibly would be easier and more comfortable to carry. It could be disassembled when necessary, would not rust, and possibly would roll smoother. Also the alternate embodiments that use washers, endcaps and a removable axle pin or pins could easily and inexpensively be manufactured and could be disassembled and reassembled if necessary. If an alternative embodiment was made of plastic, it could be color coded to improve visualization. It would also be inexpensive to manufacture, lightweight and smooth rolling.

FIG. 4 is a proposed embodiment of the invention with like numerals representing like elements representing other embodiments of the invention. In the embodiment represented by FIG. 4, axle pin 11 is detachable from yoke 3 so that rolling element 1 can be assembled onto axle pin 11 and the joint made by removable axle pin 11 with yoke 3 is strong, secure so that it doesn't come apart when used and smooth to prevent the device from catching on irregular surfaces. In this embodiment axle pin 11 and yoke 3 can be manufactured from semi-rigid materials like nylon, plastic, some having natural elastic memory so if distorted it returns to it's previous shape. Nylon and certain similar materials being almost unbreakable and quite flexible. Axle pin 11 and yoke 3 can also be manufactured out of a rigid material like metal which is strong and difficult to bend out of it's desired shape. Yoke 3 and axle pin 11 can also be fabricated from a combination of materials so long as the attachment of axle pin 11 to yoke 3 is strong, secure and smooth for unhindered movement of the finished device and for easy assembly. In the embodiment depicted in FIG. 4, axle pin 11 has an axle pin end connector 15 on both terminal ends of axle pin 11 which is a socket that is fitted for yoke end connector 14. Yoke end connector 14 is found on both terminal ends of yoke 3 and is a ball protrusion or snaphead that snaps into axle pin end connector 15. The snap connection of yoke 3 to axle pin 11 allowing for a simple, tight and smooth joint with no excess parts necessary to create fusion of axle pin 11 to yoke 3. Washer element 12 made of metal, plastic or nylon type materials orients rolling element 1 by fitting tightly on axle pin 11 and by being inserted close to rolling element 1. Washers 12 allow for smooth movement of rolling element 1 and prevent rolling element 1 from brushing against the arms of yoke 3 and diverting the device from moving in a straight downward manner.

To assemble, axle pin 11 is inserted into rolling element 1 and washers 12 are positioned on either side of rolling element 1. Then the former assembly is snapped onto yoke 3 by means of yoke end connectors 14 fastening onto axle pin end connectors 15. The completed yoke 3 and rolling element 1 assembly is connected with a tape measure or surveying chain as in the method described in the first embodiment depicted in FIG. 1, FIG. 2 and FIG. 3.

FIG. 5 is a detail of yoke end connector 14 and axle pin end connector 15. Yoke end connector 14 is fabricated as an integral part of yoke 3 in one manufactured piece so it will be strong and unbreakable with normal use. The joining of axle pin 11 with yoke 3 is not meant to be taken apart after assembly of rolling element 1 onto axle pin 11. Axle pin end connector 15 is a machined socket that allows for a strong and secure snap fastening with yoke end connector 14.

FIG. 6 is another embodiment of the invention where rolling element 1 is not pierced through it's entire length but has two pierced diametric openings on it's outer surface that allow for fitting with two detachable axle pins 11. Because rolling element 1 is not pierced through it's entire length, rolling element 1 is prevented from rubbing on yoke 3 or washer 12 and rolling element 1 will rotate smoothly and evenly on both axle pins 11. Axle pins 11 also have molded end caps 13 and washer 12 elements positioned on the inside surface of the arms of yoke 3. The molded end caps 13 on axle pins 11 are manufactured as one unit with axle pins 11 inorder to eliminate the possibility of the end caps 13 from coming off and causing one or both axle pins to bind inside rolling element 1 or move in another manner that is not smooth and uniform. Washer elements 12 positioned on the inside surface of yoke 3 serve to stabilize rolling element 1 when it is free moving on axle pins 11 so there is smooth unhindered rotation, or to stabilize movement of axle pins 11 with respect to yoke 3 when rolling element 1 fits snugly with axle pins 11 and movement takes place between axle pins rotating in orifice 16 located in the terminal ends of the arms of yoke 3. As stated above in this embodiment rolling element 1 can be fixed with axle pins 11. Axle pins 11 can also rotate in respect with yoke 3 which is provided with openings 16 in both terminal arms of yoke 3. These openings are not in view in FIG. 6 but are simply holes of greater diameter than axle pins 11 to allow for smooth rotation. Likewise, rolling element 1 can also roll freely about axle pins 11 which can be fixed in the opening 16 of terminal arms of yoke 3. Components of this embodiment can be fabricated from a variety of materials including nylon, plastic, metal, wood. The materials used selected for strength, unhindered and smooth rotation and durability. To make the embodiment shown in FIG. 6, axle pins 11 are inserted from the outside surface of yoke 3 through orifice 16, witch end caps 13 which are integral units of axle pins 11 on the exterior of yoke 3, washers 12 are fitted onto axle pins 11 then rolling element 1 is positioned within the arms of yoke 3 and axle pins 11 are pushed into rolling element 1. The linkage fastener 6 then joins to eyelet 5 on yoke 3. Linkage fastener 6 is attached to swivel connector 7 and linkage fastener 8 which is attached to a metal tab 9 on a tape measure 10 or surveying chain. This attachment of linkage chain with eyelet 5 of tape deployment aid and with tape measure or surveying chain is standard with all embodiments.

FIG. 7 is yet another embodiment of the invention having rolling element 1 pierced through it's core by it's entire length. Axle pin 11 is one detachable piece provided with locking end caps 13 and washers 12. Rolling element 1 can fit snugly with axle pin 11 so that the axle pin 11 rolling element 1 assembly rotates within openings 16 found in the terminal arms of yoke 3 or rolling element 1 can revolve about axle pin 11. To assemble axle pin 11 is inserted into orifice 16 in yoke 3 until it protrudes a few millimeters in from the inner surface of one arm of yoke 3. Then washer 12 is fitted onto axle pin 11. This is followed with the fitting of rolling element 1 which is positioned within the two arms of yoke 3. Axle pin 11 is then pushed into rolling element 1 followed by the placement of washer 12 on axle pin 11 now containing rolling element 1. Finally, axle pin 11 is fitted through the opposite orifice 16 in yoke 3 so that both ends protrude slightly from the external surface of yoke 3 and then end caps 13 are fitted onto the protruding ends of axle pin 11 by means of threadings or other securing techniques.

FIG. 8 is still another embodiment of the invention having rolling element 1 which is pierced through it's core by it's entire length and lined with sleeve means 2. Axle pins 11 are non continguous with respect of one to the other although contiguous with yoke 3. The former assembly is made of any material that is pliant and durable so that rolling element 1 can be attached and detached as necessary. Neck 4 with eyelet 5 is formed on yoke 3. Eyelet 5 attaches to connection means consisting of linkage fastener 6 connected to swivel connector 7 which also attaches to linkage fastener 8 which is then attached to a metal tab 9 on a tape measure 10.

In all of the above described embodiments of the present invention there are envisioned, as illustrated, preferred dimensions of yoke element, axle element and connectors; each portion being approximately one third of the total length of the tape measure deployment aid.

To use the tape deployment aids depicted by the above embodiments, the operator connects the device to a free length of tape or chain which is approximately the length of roof to be measured, and releases the device from the ridge of a roof so gravity propels the device and the design of the device allows for straight, smooth movement of the device which pulls along or carries the trailing tape or chain. The rolling element extends to just beyond the edge of the roof and the tab 9 of the tape measure can attach onto the edge of the roof. This method keeps the operator a safe distance from the edge of the roof and allows for very accurate measuring because the trailing tape measure does not twist and moves vertically down the roof.

An alternate method that may be necessary when the roof is very gabled and steep, is to stand on a ladder propped against the edge of a roof and throw the device with a free length of tape or chain, so it catches on the ridge of the roof and the measurement is then taken from the straightened tape or chain from the edge of the roof. In this method the operator must be knowledgeable about surrounding structures especially electric wires and never attempt this method under potentially dangerous circumstances.

What is claimed:

1. An accessory for a measuring tape device comprising:
   a. weighted roller means for gravity assisted deployment of said tape measuring device,
   b. yoke means, having at least two supporting legs for harnessing said weighted roller means,
   c. axle means for rotatable mounting of said weighted roller means, to said yoke means,
   d. connection means pivotable in at least two planes; said connection means for attaching said yoke means to a measuring tape device.

2. The invention of claim 1 wherein said connection means further comprises a swivel connection interposed between at least two linkage fasteners.

3. The invention of claim 1 wherein said roller means comprises a ball provided with at least two opposing coaxially bored holes.

4. The invention of claim 3 wherein said bored holes are furthermore lined with sleeve means for reducing frictional resistance.

5. The invention of claim 4 wherein said sleeve means is of a smooth and rigid material.

6. The invention of claim 1 wherein said axle means comprises a fixed portion of said yoke means connected to and continuous with each of said supporting legs of said yoke means.

7. The invention of claim 6 wherein said yoke means is wire formed into a stirrup shaped configuration, wherein said axle means is formed by elbowing portions of said supporting legs of said yoke means to intersect to form a contiguous axle stirrup leg member.

8. The invention of claim 7 whereby the end opposite said terminal ends of said supporting legs, distally located with respect to said axle means, is twisted to form a neck with an eyelet for attaching to said connection means.

9. The invention of claim 6 wherein said yoke means has a stirrup shaped configuration, wherein said axle means comprises at least two axle pin members which are non intersecting, said axle pin members being contiguous with and elbowed from each of said supporting legs of said yoke means.

10. The invention of claim 6 wherein said neck is contiguous with said supporting legs of said yoke means, furthermore said neck is positioned equidistant with respect of one supporting leg to the other.

11. The invention of claim 1 wherein said yoke means is "Y" shaped comprising a. a neck provided with an eyelet connector at a first end for attaching to said connection means b. said supporting legs provided with terminal end attachments distally located relative to said neck, and c. said axle means comprising a horizontal rod provided with second terminal end attachments for fastening with said supporting legs of said yoke means.

12. The invention of claim 11 wherein said yoke means, and said axle means are made of nylon.

13. The invention of claim 11 wherein said yoke means and said axle means are made of plastic.

14. The invention of claim 11 wherein said yoke means and said axle means are made of wood.

15. The invention of claim 11 wherein said yoke means and said axle means are made of metal.

16. The invention of claim 1 wherein said yoke means is "Y" shaped comprising a. a neck provided with an eyelet connector for attaching to said connection means at a first end b. said two supporting legs comprising openings on the terminal ends of said legs distally located relative to said neck, and c. said axle means comprising a horizontal rod of smaller diameter than the openings on said terminal ends of said supporting legs so that said horizontal rod freely rotates within said supporting legs.

17. The invention of claim 16 wherein said horizontal rod comprises at least two like and separate rods which are smaller in diameter than the openings on said terminal ends of said supporting legs of said yoke means, wherein said rods are inserted through said openings of the terminal ends of said supporting legs and then inserted into diametrically opposed coaxially bored non-intersecting sockets, so that said rods and said roller means form a fixed unit so that said axle means rotates freely within said yoke means.

18. The invention of claim 1 wherein said yoke means, said roller means and said connection means have substantially equal lengths relative to one another.

* * * * *